(12) United States Patent
Yamazaki

(10) Patent No.: US 6,285,184 B1
(45) Date of Patent: Sep. 4, 2001

(54) SPEED AND POSITION SIGNAL GENERATOR

(75) Inventor: Fumio Yamazaki, Ebina (JP)

(73) Assignee: Kabushiki Kaisya Tokyo Kakai (JP)

( * ) Notice: Subject to any disclaimer, the term of this patent is extended or adjusted under 35 U.S.C. 154(b) by 0 days.

(21) Appl. No.: 09/257,085

(22) Filed: Feb. 24, 1999

(30) Foreign Application Priority Data

Feb. 27, 1998 (JP) .................................................. 10-061939

(51) Int. Cl.$^7$ .............................. G01B 7/30; G05B 19/07; G01P 3/481
(52) U.S. Cl. .................... 324/207.25; 324/166; 324/165; 318/567
(58) Field of Search ............................... 324/166, 207.18, 324/207.25, 233; 318/82, 493, 494, 560, 767, 806, 567; 340/870.35

(56) References Cited

FOREIGN PATENT DOCUMENTS

| 02016830 | 1/1990 | (JP) . |
| 03273316 | 4/1991 | (JP) . |
| 03157013 | 7/1991 | (JP) . |
| 05227776 | 9/1993 | (JP) . |
| 10114058 | 6/1998 | (JP) . |
| 10281809 | 10/1998 | (JP) . |

OTHER PUBLICATIONS

USPTO Translation 2001–479; Translation into English of Japanese Published Unexamined (Kokai) Patent Application No. H3–273316, published Dec. 4, 1991. Inventors: Suzuki et al., Undated.*

* cited by examiner

*Primary Examiner*—Hezron Williams
*Assistant Examiner*—Henry A. Andersen
(74) *Attorney, Agent, or Firm*—Bierman, Muserlian and Lucas

(57) ABSTRACT

There is provided a speed and position signal generator which operates irrespective of mechanical error, and also operates without any delay of signal transmission. The speed and position signal generator generates A, B phase pulse signals corresponding to a frequency set value and direction setting, and outputs these two phase pulse signals and a Z phase pulse signal corresponding to a teeth number set value, and includes a reference clock generator as a reference, a frequency arithmetic operation circuit, a frequency division circuit for frequency dividing an output phase train from the frequency arithmetic operation circuit, an A, B phase generation circuit for generating A, B phase pulse signals using the frequency division signal, and a Z phase generator circuit for generating a Z phase pulse signal.

1 Claim, 5 Drawing Sheets

SPEED AND POSITION SIGNAL GENERATOR

BACKGROUND OF THE INVENTION

1. Field of the Invention

The present invention relates to a speed/position signal generator for outputting pulse signals of A and B, and Z phases corresponding to a frequency set value and a teeth number set value. "Teeth number" means the number of generated pulses per one rotation of a rotary encoder.

In brief, this generator electronically emulates the prior mechanical-type to phase incremental rotary encoder (two phase PG—that is, pulse generator) involving Z phase, which means that said generator statistically generates a signal corresponding to a rotation pulse of an electric motor.

2. Prior Art

When the rotation speeds of a plurality of electric motors are controlled, it is conventionally performed by controlling a deviation between a revolution speed of one electric motor (hereinafter referred to as a parent motor) among the plurality of electric motors and that of another electric motor (hereinafter referred to as a child motor) taking the revolution speed of the parent motor as a reference.

However, in such a construction there is a displacement of a mechanical rotary shaft of the parent motor, and a reference value produced owing to the error is transmitted to the child motor as it is. Further, any delay of signal transmission between the parent motor and the child motor makes highly accurate synchronization control difficult. This is undesirable for situations where a plurality of electric motors are operated.

In view of the difficulties with the prior art, it is an object of the present invention to provide a speed and position signal generator without any delay of signal transmission irrespective of mechanical error.

SUMMARY OF THE INVENTION

To achieve the aforementioned object, there is provided a speed and position signal generator for generating A and B phase pulse signals corresponding to the frequency set value and a direction set value, and further outputting these two phase pulse signals and a Z phase pulse signal corresponding to the teeth number set value, wherein it comprises a reference clock generator, a frequency arithmetic operation circuit, a frequency division circuit for dividing the frequency of a pulse train output from the frequency arithmetic operation circuit, an A and B phase generation circuit for generating A and B phase pulse signals from the divided frequency pulse signal, and a Z phase generation circuit for generating a Z phase pulse signal from the A and B phase pulse signals and teeth number set value.

The speed and position signal generator is characterized in that the reference clock signal is inputted into said frequency arithmetic operation circuit and further the output frequency set value is inputted, and further the pulse train output from the frequency arithmetic operation circuit corresponding to the output frequency set value is inputted into the frequency division circuit and frequency division pulse signal generated by the frequency division circuit is inputted into the A and B phase generation circuit, and in that the frequency division pulse signal is assumed to be the A phase pulse signal and a pulse train at the same frequency having a phase difference with respect to the A phase pulse signal is generated as the B phase pulse signal which is outputted together with the A phase pulse signal, and further in that these A and B phase pulse signals are inputted into the Z phase generation circuit where a pulse signal is generated for each reference position of the A and B phase pulse signals using the teeth number of set value.

DETAILED DESCRIPTION OF THE INVENTION

In what follows, an embodiment of the present invention will be described in detail with reference to the accompanying drawings.

Figure 1:
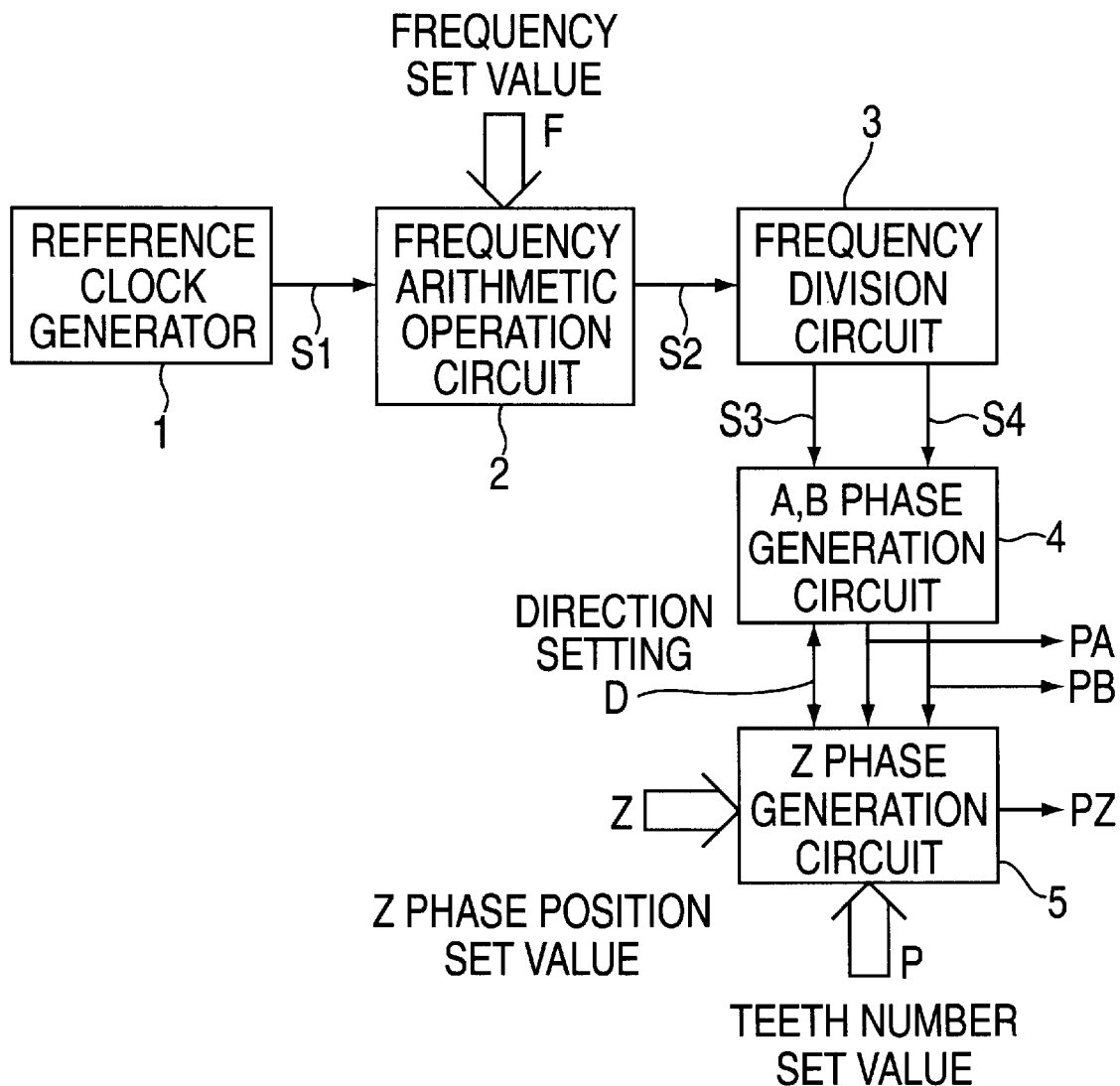
FIG. 1 is a block diagram illustrating an embodiment of the present invention.

As illustrated in FIG. 1, a speed and position signal generator of the embodiment according to the present invention is adapted such that pulse signals of the A and B phases corresponding to a frequency set value F and a direction set value D are selectively set to a predetermined value, and these two phase pulse signals and a Z phase pulse signal PZ corresponding to a teeth number set value P are outputted, and is adapted such that it comprises a reference clock generator 1 serving as a reference, a frequency arithmetic operation circuit 2, a frequency division circuit 3 for executing frequency division for an output pulse train from the frequency arithmetic operation circuit 2, and A and B phase generation circuit 4 for generating the A and B phase pulse signals PA, PB using a frequency division pulse signal, and a Z phase generation circuit 5 for generating the Z phase pulse signal PZ.

In the speed and position signal generator, the reference clock generator 1 generates a reference clock S1, which is inputted into the frequency arithmetic operation circuit 2. The frequency set value F is inputted into the frequency arithmetic operation circuit 2. A pulse train output S2 from the frequency arithmetic operation circuit 2 corresponding to the output frequency set value F is inputted into the frequency division circuit 3. Frequency division pulse signals S3, S4 generated in the frequency division circuit 3 are inputted into the A and B phase generation circuit 4. In the A and B phase generation circuit 4, one of the frequency division pulse signals S3, S4 (S3: the pulse signal of the penultimate stage of the frequency division circuit 3. S4: the pulse signal of the final stage of the frequency division circuit 3) is assumed to be the A phase pulse signal PA, and the other is used to generate a pulse train of the same frequency having a phase difference from the former corresponding to the direction setting D. The two signals PA and PB are outputted to the outside.

Further, the A and B phase pulse signals PA, PB are inputted into the Z phase generator circuit 5, in which a pulse signal, i.e., the Z phase pulse signal PZ, is generated, at each reference position of the A, B phase pulse signals PA. PB using a Z phase position set value Z (selectively set to a predetermined value) and the teeth number set value P.

A relationship among the respective frequency f1, f2, f3 and f4 of said S1, S2, S3 and S4 is as follows:

$f3 = f1 \times F \times (\frac{1}{2}^n) \times (\frac{1}{2}^{m-1})$ $f4 = f1 \times F \times (\frac{1}{2}^n) \times (\frac{1}{2}^m)$ $f1 \times F \times (\frac{1}{2}^n)$ is generated in the frequency arithmetic operation circuit 2, and $(\frac{1}{2}^{m-1})$, $(\frac{1}{2}^m)$ is generated in the frequency division circuit 3. The frequency arithmetic operation circuit 2 is concretely a binary rate multiplier, and (n) is a bit number of the same. The variable (m) of the frequency division circuit 3 is a bit number thereof, and $2^{m-1}$ and $2^m$ are frequency division ratios, respectively.

For example, when the reference clock frequency f1 is assumed to be 4,096 Hz, the bit number (n) of the binary rate multiplier 2 to be 8 bits, the bit number (m) of the frequency division circuit 3 to be 4 bits, and the frequency set value F takes 0, 1 to 255 as a valid value, f3 and f4 are as follows:

F=0:
  f3=f4–0 Hz.

F=1:
  $f3 = 4{,}096 \times 1 \times (\frac{1}{256}) \times (\frac{1}{8}) = 2$ Hz.
  $f4 = 4{,}096 \times 1 \times (\frac{1}{256}) \times (\frac{1}{16}) = 1$ Hz.

F=255:
  $f3 = 4{,}096 \times 255 \times (\frac{1}{256}) \times (\frac{1}{8}) = 510$ Hz.
  $f4 = 4{,}096 \times 255 \times (\frac{1}{256}) \times (\frac{1}{16}) = 255$ Hz.

Figure 2:
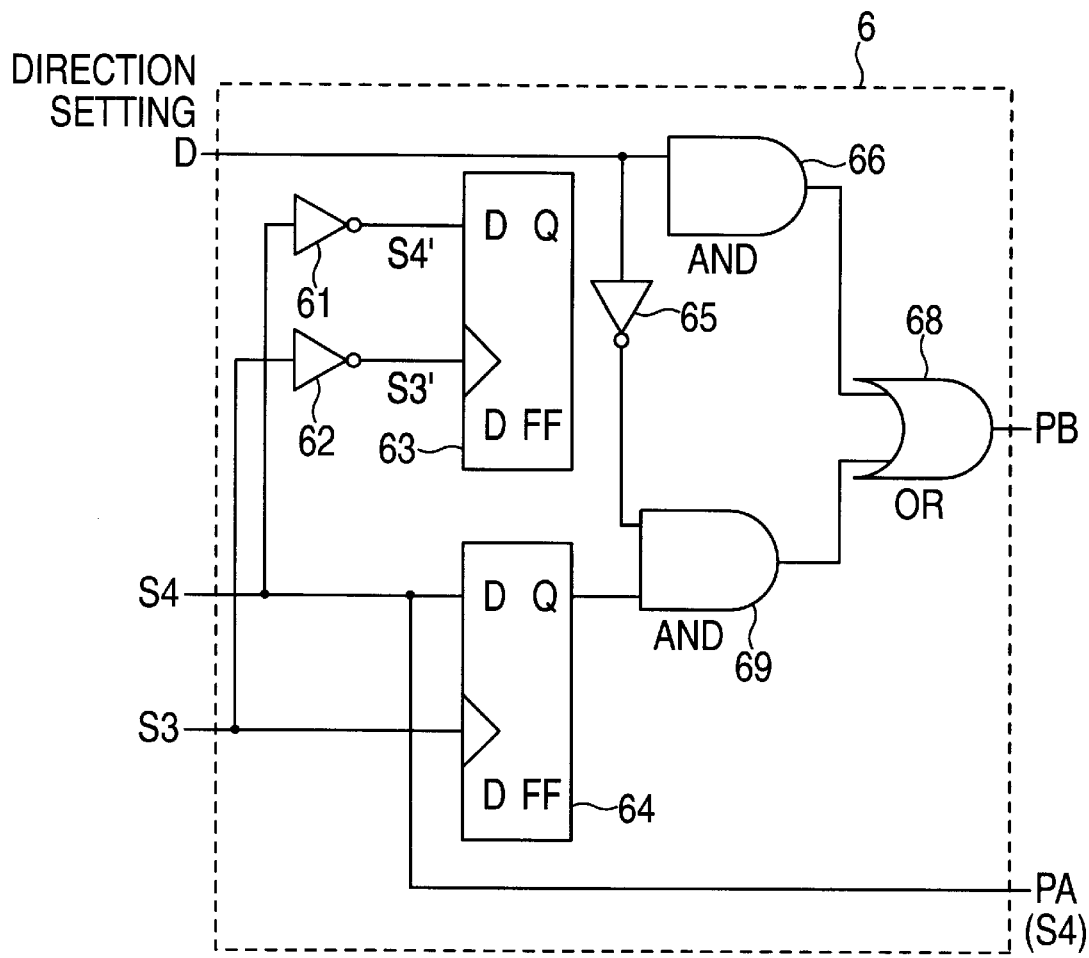
FIG. 2 is a block diagram illustrating the detail of the A, B phase generation circuit.

FIG. 2 is a block diagram illustrating the detail of the A, B phase generation circuit. As illustrated in FIG. 2, the direction setting D, the frequency division pulse signal S4 on the final stage in the frequency division circuit 3, and the pulse signal of the penultimate stage of the frequency division circuit 3 are inputted, and the A phase pulse signal PA and the B phase pulse signal PB are outputted by a combination circuit 6 of a logical gate and a D-type flip-flop.

Figure 3:
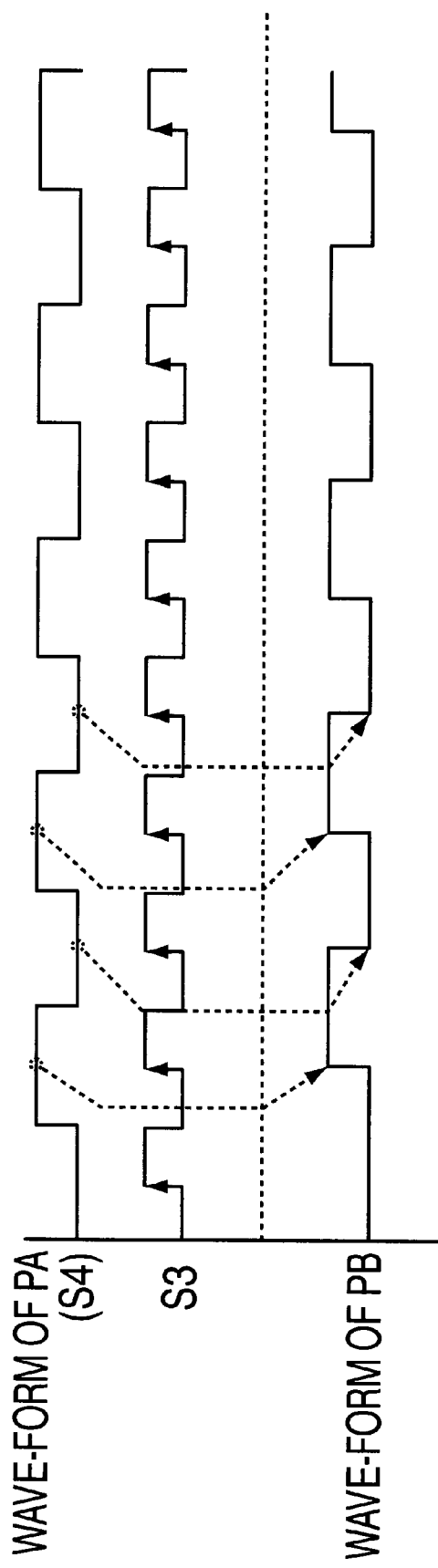
FIG. 3 is a timing chart when the direction setting is zero in which the A, B phase pulse train is generated and outputted in which the A phase is advanced with a rising edge (otherwise falling edge) of the frequency division pulse signal S3.

FIG. 3 is a timing chart when the direction setting is zero in which the A, B phase pulse train is generated and outputted in which the A phase is advanced with a rising edge (otherwise falling edge) of the frequency division pulse signal S3. (In FIG. 3, the wave form of the A phase is illustrated.)

Figure 4:
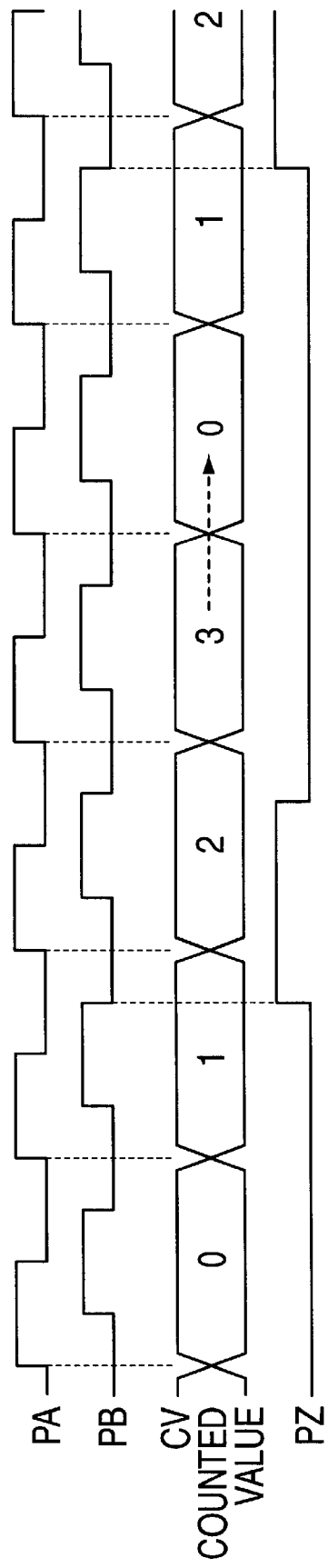
FIG. 4 is a timing chart illustrating a relationship among the A and B phase pulse signals PA and PB, and the Z phase signal PZ.

FIG. 4 is a timing chart illustrating a relationship among the A and B phase pulse signals PA and PB, and the Z phase pulse signal PZ. In this timing chart, the teeth number set value P is assumed to be three, the Z phase set value Z to be one, and the direction discrimination flag (direction setting D) to be OFF (A phase advanced).

A rotation direction is indicated in a phase relationship between the PA and PB, and a reference position (one rotation) is indicated by the PZ. In the case of the prior art mechanical two phase PG, the position of the Z phase is determined by the position of a slit, and hence when the reference position in the rotation angle of an electric motor is changed, coupling between the electric motor and the PG must be adjusted while in the present invention the reference position is changed by changing the Z phase position set value.

Figure 5:
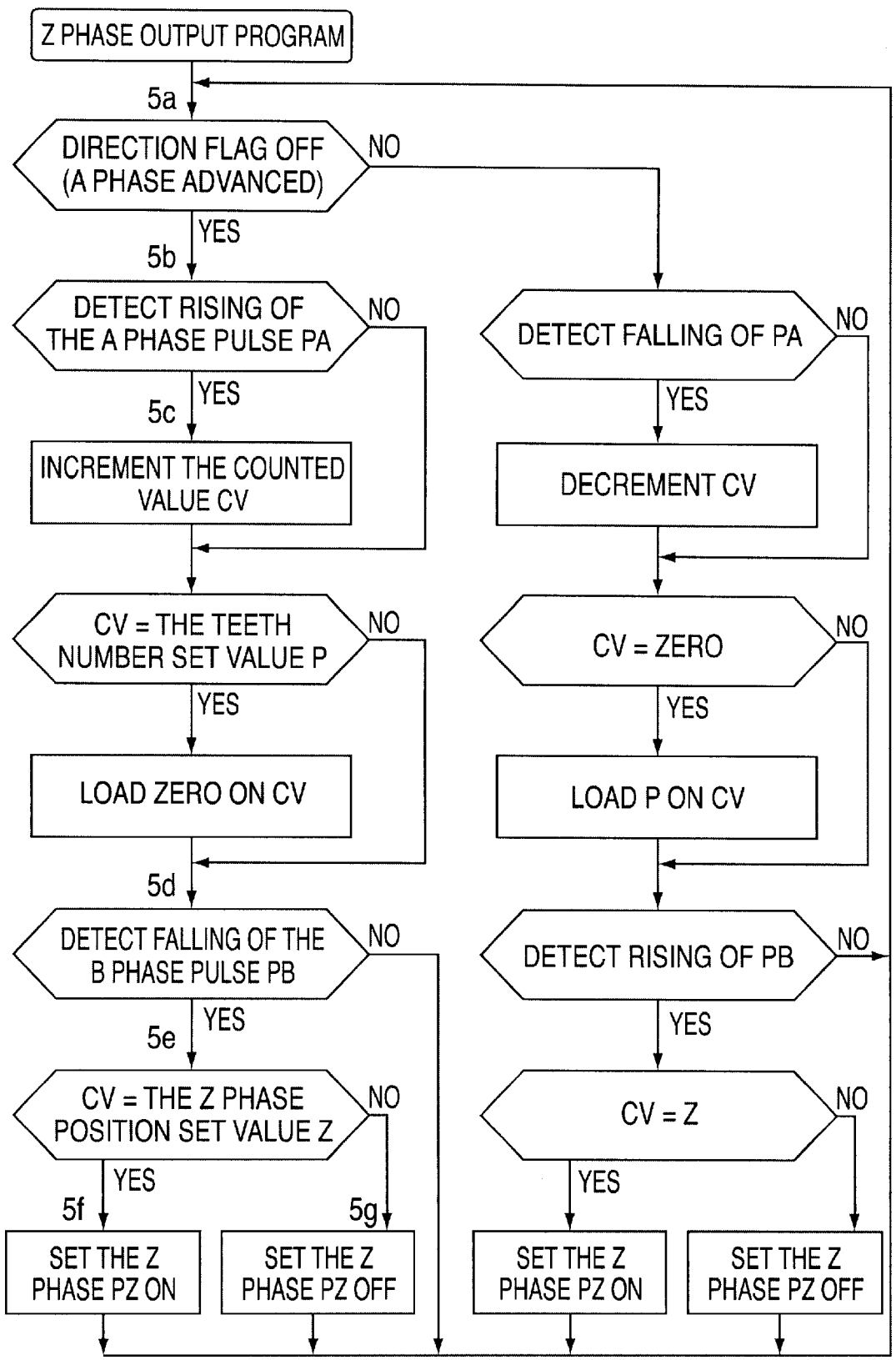
FIG. 5 is a flow chart illustrating one embodiment when the Z phase is generated.

FIG. 5 is a flow chart illustrating one embodiment when the Z phase is generated.

As illustrated in FIG. 5, if the direction discrimination flag (direction setting D) (5a) is OFF (ON), then rising (falling) of the A phase pulse PA is detected (5b) using edge detection in the range of from zero or more to the teeth number set value P or less, and the counted value CV is incremented (decremented) (5c), while falling (rising) of the B phase pulse PB is detected (5d) in an edge detection timing, and if the counted value CV is equal to the Z phase position set value (5e), then the Z phase is made ON (5f), while if not, then it is made OFF (5g), whereby the Z phase pulse PZ is generated upon a A phase lead (B phase lead) pulse being outputted.

If the direction discrimination flag (direction setting D) (5a) is ON, then the Z phase pulse is generated following a flow chart illustrated on a right side in the figure.

According to the present invention, as described above, a speed and position signal generator can be provided irrespective of mechanical error, and this generator can be also provided without any delay of signal transmission, which generator is thus practically very useful.

What is claimed is:

1. A speed/position signal generator for generating A, B phase pulse signals corresponding to a frequency set value and a direction set value, and outputting a Z phase pulse signal corresponding to said A, B pulse signals and a teeth number set value, which comprises:

a reference clock generator for generating a reference clock;

a frequency arithmetic operation circuit for generating a pulse train output corresponding to the frequency set value by using a reference clock and a frequency set value;

a frequency division circuit for generating a frequency division pulse signal of the pulse train output;

an A, B phase generation circuit for generating the A, B phase pulse signals by using the frequency division pulse signal, where said pulse signal is outputted as the A phase pulse signal and a pulse train of the same frequency having a phase different corresponding to the direction set value is outputted as the B phase pulse signal; and a Z phase generation circuit for generating the Z phase pulse signal by using a reference position of the A, B phase pulse signals, and the teeth number set value;

said A, B phase generation circuit further being comprised of:

a first flip-flop in which an m-stage pulse signal S4 of said frequency division circuit is inputted, and a timing signal of any one of a rising edge or a following edge of an (m-1)-stage pulse signal S3 of said frequency division circuit is clock inputted;

a second flip-flop in which an inverted signal of said m-stage pulse signal S4 is inputted, and a timing signal of the other one of the rising edge or the falling edge of said (m-1)-stage pulse signal S3 is clock inputted; and a selective circuit for selecting the output signal of said first flip-flop or said second flip-flop, corresponding to the direction set value;

whereby said A, B phase generation circuit outputs an A-phase pulse signal PA corresponding to said m-stage pulse signal S4, and outputs a B-phase pulse signal PB corresponding to said selected output signal.

* * * * *